March 8, 1949.    J. P. BUCKEY    2,463,679
ABRADING MEANS AND METHOD OF MAKING SAME
Filed March 31, 1945
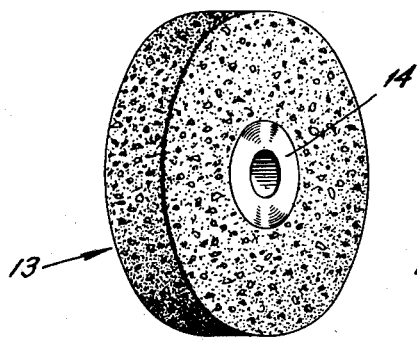
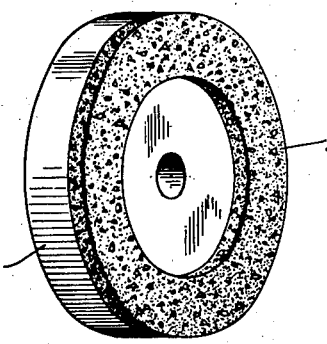
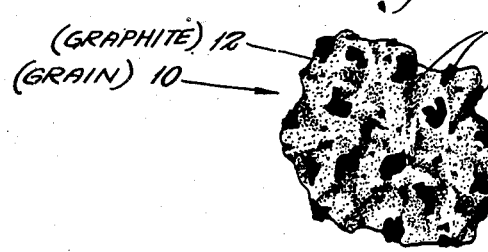
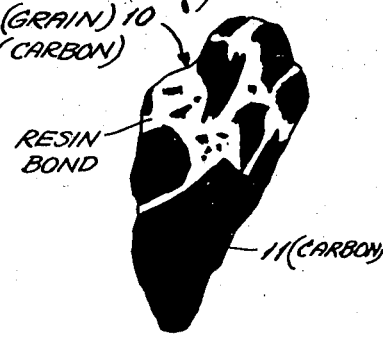
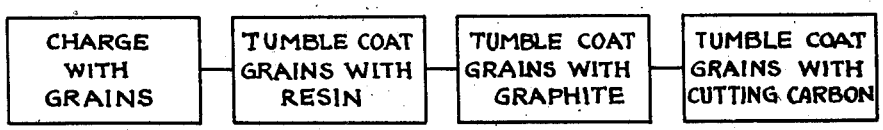
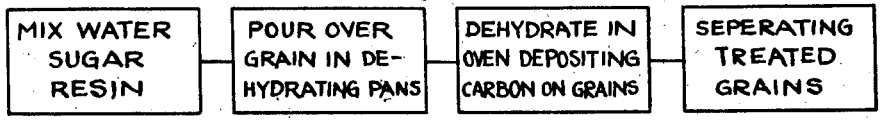
INVENTOR
Jefferson P. Buckey
BY Johnson and Kline
ATTORNEYS Patented Mar. 8, 1949

2,463,679

UNITED STATES PATENT OFFICE 2,463,679

ABRADING MEANS AND METHOD OF MAKING SAME

Jefferson P. Buckey, Easton, Conn.; John P. McGowan, administrator of said Jefferson P. Buckey, deceased, assignor to John T. Kilbride, Stratford, Conn.

Application March 31, 1945, Serial No. 585,969

13 Claims. (Cl. 51—307)

This invention relates to abrading elements and members and the method of making the same.

An object of the present invention is to provide an improved abrading grain which when used as an abrading element will readily grind or polish metallic carbides such as tungsten carbide and other hard metals and alloys of metals with facility and with comparatively less wear of the abrading member made of such elements and which will produce with more rapidly cutting grain, a cleaner cut with the resulting higher finish and luster than was previously possible.

Heretofore, difficulty has been encountered when grinding and finishing extremely hard materials such as tungsten carbide and other sintered metallic carbides which are used in and for tools and dies and other things and this has greatly deterred and limited the use and usefulness of these slow-wearing desirable materials.

In order to cut these materials satisfactorily sharp and smooth, it has been necessary to employ the so-called diamond wheel, but this wheel being made of bonded diamond grain or dust is extremely high in original cost and unless extreme care and skill is exercised during the grinding operation, may have its extremely thin surface layer gouged by the tool irreparably damaging the wheel. Silicon carbide wheels also have been used to cut this material but they are slow and do not produce the bright, lustrous cut needed, but are liable to burn and tear the metal, heat the carbide frequently causing it to fracture, and are worn or consumed very rapidly during the grinding operation. Diamond wheels generally used to finish grind tungsten carbide and the like hard metals are slow wearing, but because of this they load rapidly when grinding softer metals in which sections of the harder metals are used as inserts, and therefore in finish grinding a cutting tool for instance it was not practical to grind across the carbide tip and the adjacent low carbon steel body of the shank.

I have discovered that by incorporating crystalline carbon in the wheel or other grinding member, its cutting properties may be greatly increased and enhanced, as more fully explained in my copending application Serial No. 573,132, filed January 16, 1945, which discloses a species of this invention in which crystalline carbon is embedded in the wheel, and particularly in the bond of the wheel.

In the species of my invention described and claimed herein, the crystalline or cutting carbon is carried as a coating or deposit by the grain itself so that the grain becomes fortified, as it were, with cutting-carbon.

This embodiment of my invention, experiments and practical tests have shown, to be superior and more advantageous, for many purposes and uses, than merely interspersing cutting grain and cutting-carbon as in my said copending application. The cutting-carbon when brought against the work by the relatively hard unyielding grain is more effective as a cutting medium than when carried in the relatively softer and more yielding binder.

I have found that grains thus fortified cut both hard and soft metal or alloys of metals with equal facility and simultaneously if desired, and will not cause a disadvantageous loading or glazing of the abrading wheel or member by the transfer of the softer metal to the wheel. Further, grains thus fortified will operate in any abrading situation in which there is relative movement between the abrasive grain and the work to be cut under sufficient pressure to produce friction between them. Moreover, since the cutting-carbon is carried by the grain, the grains may advantageously be applied to canvas wheels or used as separate grains or dust, or in grinding compounds. Or they may be molded into abrading members such as abrading wheels or elements thereof and bars of any desired shape or size. They may even be used in making sanding paper and other similar devices.

Abrasive grains thus fortified with cutting-carbon have cutting properties equivalent to those of unfortified grains which are higher on the abrasive scale of hardness.

Furthermore, these fortified grains have a substantially longer life and produce a finish equivalent to a finer grain size of unfortified grains. Wheels using fortified grain operate at cutting speeds up to five times greater and last up to ten times longer than wheels having unfortified grain and cuts made by such grain of the present invention are bright and lustrous and do not exhibit the torn dark streaks or burned surfaces heretofore found in surfaces cut by unfortified grain.

According to the present invention where it is desired to keep the heat to a minimum and produce an extremely high finish a small amount of unctuous graphite may be included in the fortification of the grain.

Preferably, the cutting-carbon for fortifying the grain comprises colloidal isotropic vitrescent carbon derived from carbohydrates such as sugar, molasses or the like. However, any relatively fine carbon crystals, however derived, capable of producing a cut may be used.

A feature of the present invention is the provision of methods of cheaply and readily fortifying grains by securing cutting-carbon to their surfaces. This may be accomplished by reducing sugar or the like to carbon and directly depositing it on grain or by securing preformed carbon crystals to the surface of the grain with a suitable bonding medium.

Other features of the invention will be apparent from the specification and claims when considered in connection with the drawings in which:

Figure 1 shows a wheel having fortified grain therein.

Fig. 2 shows an abrasive ring mounted on a plate.

Fig. 3 shows an enlarged view of a fortified grain.

Fig. 4 shows an enlarged view of another fortified grain.

Fig. 5 shows a diagram of one process of making the grain of the present invention.

Fig. 6 shows a diagram of another process of making the grain of the present invention.

In the species of the invention herein disclosed friable grain 10 has secured to the surfaces thereof crystals of cutting-carbon 11. While I presently prefer to use flint, quartz or the like sand, aluminum oxide and silicon carbide as the abrasive grain to be fortified, it is to be understood that any of the other abrasive grains may be fortified in accordance with the present invention.

The cutting-carbon may be of any crystalline carbon capable of cutting. However, the cutting-carbon presently preferred is isotropic vitrescent crystalline carbon derived from a dehydrated or reduced carbohydrate such as sugar, molasses or the like. Throughout the specification and claims the term "sugar carbon" is used to denote a carbon produced from any of these substances. These crystals, particularly when reduced in the presence of an activating electrolyte, such as sodium hydroxide, remain in colloidal form and may be readily secured to the surface of the grains by any suitable binder. This carbon acts to increase the cutting action rather than lubricate or increase the porosity of the wheel and hence is called cutting carbon. The grain carrying the cutting-carbon supports and backs up the carbon during the cutting operation and maintains it in position to secure the most efficient action of the carbon.

Preferably, the particles of cutting-carbon are bonded to the surface by a water soluble phenolic resin. This type of binder being slightly on the acid side tends to neutralize some of the electrolyte so that a number of the colloidal particles flocculate to form crystals of several microns in size on the surface of the grain forming the abrading elements shown in Figs. 3 and 4.

The fortified grains of the present invention are discrete particles used in any abrading or polishing operation in which the grain is caused to have relative movement with respect to the work with sufficient pressure to produce friction. It may be used in grain form in abrading and polishing of materials. Also the grain may be applied to canvas polishing wheels or made up into grinding compounds or abrading members such as abrading wheels or elements thereof, sanding paper or other similar devices. I have discovered in tests of the grain in its various uses that while it is consumed during use, it has a two to five times longer life than grain devoid of crystalline cutting carbon on the surface.

Fig. 1 shows an abrading wheel 13 made up of fortified grain and a destructible resin bond of the usual type and formed on a steel hub 14. The wheel is molded and hardened in the usual manner of making said wheels. Fig. 2 shows an abrasive ring 15 including fortified grain bonded to a steel backing plate 16.

An advantage of abrading members made from fortified grain bonded together is that as the friable grain and bond in the surface of the wheel break down or are dressed away, new cutting surfaces having carbon-carrying grain are exposed so that the advantages of the grain of the present invention are always present throughout the life of the member.

The abrading members are preferably made entirely from fortified grain in order to take full advantage of the improved properties of the grain. For some types of work, it may be desired to use less than 100% of fortified grain in the wheel. I have tested wheels having 25%, 50% and 75% of fortified grain and the balance untreated grain and found that they cut better than a wheel made from untreated grain, the efficiency of the wheel and the brightness and luster of the cut being substantially proportional to the amount of fortified grain used.

I have found that an abrading grain or element fortified with cutting-carbon on the surface is substantially increased in its abrading properties so that it cuts the metallic carbides and other metals equal to or better than an unfortified grain higher on the abrasive scale.

This was best shown by comparing cuts made on tungsten carbide by wheels made of fortified quartz sand grain, fortified aluminum oxide grain and fortified silicon carbide grain with wheels made of unfortified aluminum oxide, silicon carbide and diamond.

The wheel made of fortified sand grain abraded the tungsten carbide to substantially the same extent as did the unfortified aluminum oxide. The fortified aluminum oxide wheel cut the tungsten carbide to substantially the same extent as did the silicon carbide wheel and the fortified silicon carbide wheel cut the tungsten carbide substantially the same as did the diamond wheel.

Heretofore, it was unknown to abrade metallic carbides or hard carbon-steels with a sand wheel and the use of aluminum oxide wheels and silicon carbide wheels for finish grinding of tungsten was not extensive. By fortifying the grain and increasing its cutting properties I have therefore opened up new uses for them in cutting harder metals and have provided inexpensive abrading elements which will readily cut and finish carbides of metals and the like with deep, lustrous cuts.

As noted above, in cutting tungsten carbide or the like tools which are usually mounted in softer metal shanks difficulties have been encountered due to loading of the wheel by the transfer of the softer metal to the wheel as it passes from the tool tip and along the shank. To overcome this difficulty it has been proposed to use two wheels, one for cutting the tungsten carbide or the like and another for cutting the shank metal. While this avoided loading the wheel for cutting the tool by the metal of the shank it added an operation and slowed down the grinding of the tool.

The grains of the present invention, however, cut both hard and soft metals or alloys of metals with equal facility and do not cause the softer metals to be transferred to the wheel or abrading member so as to disadvantageously load or glaze the same. A wheel of the present invention, therefore, will cut both the tool and shank in a single sweep or cut without requiring the use of two different wheels for the job.

Furthermore, the fortified grains of the present invention produce a finer and superior finish than that obtained by unfortified grains of the same grain size. Tests show that a wheel made up of fortified 30 mesh grain produces a surface the equivalent of a 46 mesh unfortified grain. Similarly, a wheel having fortified 90 mesh grain produces a finish finer than that made by an unfortified 120 mesh grain. The cuts which are made by these wheels are bright and lustrous and do not exhibit the tears, dark streaks or burnt surfaces heretofore found in surfaces cut by unfortified grain.

I have discovered that wheels made of fortified grain are much cooler in operation than are wheels made of unfortified grain and hence they do not burn, damage or fracture the work being cut as heretofore.

Not only do the abrading elements when fortified according to the present invention improve as to abrasive properties and fineness of finish but wheels or other abrading members made from these fortified grains, under comparative tests, have cut up to five times as fast and have lasted up to ten times as long as wheels made of unfortified grain. This is of tremendous advantage from an operating viewpoint since it reduces the cost of the operation and increases the output with less time out for changing wheels.

When it is desired to keep the heat to a minimum and at the same time produce an extremely high finish on the work a small amount of unctuous graphite is smeared over the surface of the grain as the grain is prepared and bonded thereto as indicated at 12 in Fig. 3.

The grain may be made by bonding preformed crystalline carbon to the surfaces thereof by following the steps named in Fig. 5 or by depositing the crystalline carbon on the surfaces of the grain by following the steps named in Fig. 6.

By the first-mentioned method the grains are coated with a bonding agent and preformed crystalline carbon is spread over the surface of the grains and secured thereto. As an example of this method, which produces the grain of Fig. 3, 100 pounds of grain is placed in a mixer or tumbler and a mixture of 1.5 liters of water and 200 grams of water soluble resin, preferably Monsanto #410 water soluble phenolic resin, is added. The mixer or tumbler is operated until the surfaces of the grains are coated or wetted with the resin. One hundred and twelve grams of finely divided graphite is added to the tumbler or mixer and the mixer or tumbler is operated until the graphite is smeared on and adheres to the surface of the resin-coated grain. It is preferred to use natural graphite from Ceylon for this purpose since it is more unctuous than other graphites. After the graphite is thoroughly smeared on the grain, 112 grams of preformed isotropic vitrescent colloidal carbon, such as described in my companion application Serial No. 578,948, filed February 20, 1945, is added to the mixer and the tumbling continued until the carbon is distributed over and secured to the surfaces of the grain by the resin and the grains no longer have any tendency to adhere to one another.

The foregoing process may be expedited by preheating the grain to between 140° F. and 160° F. and maintaining this temperature during the mixing or tumbling operations.

The process above described has an advantage in that it is carried out at low temperatures and that all of the ingredients are in discrete form and can be readily and easily measured to obtain the required bond and fortification. By controlling the amount of crystalline carbon added to the mixer, the extent of fortification of the grain may be accurately regulated. In the foregoing example about .54% by weight of graphite and carbon is added to the grain. This is the present preferred carbon content; however, it may be varied between .25% to 10%.

If desired, the step of adding the graphite can be eliminated and the cutting carbon alone placed on the surface of the grain.

In fortifying the grains by the second-mentioned method a fortifying solution of sugar, molasses and water is provided with a small amount of water soluble bonding agent. This fortifying solution is poured over grains and placed in an oven. The temperature in the oven is raised to substantially 550° F. and the grain left in the oven until the carbon on the fortifying solution has been reduced to isotropic vitrescent crystalline carbon which is deposited during the reduction on the surfaces of the grain and bonded thereto by the bonding agent. As an example of this method of producing the fortified grain as shown in Fig. 4, a fortifying solution is mixed by dissolving 375 grams of sugar and 28 grams of water soluble phenolic resin in six liters of water. Five pounds of grains of the desired mesh is placed in a dehydrating pan and one-third of this solution poured over it. The dehydrating pan is placed in a dehydrating oven wherein the temperature is raised to 550° F. The material is kept in the oven for two hours or such time as required to reduce the sugar to isotropic vitrescent carbon which is deposited on the surface of the grain and bonded thereto by the resin. The mass of crystals produced in the dehydrating pan is extremely friable and with little manual effort could be put through a 20 mesh Tyler screen. By regulating the amount of sugar in the fortifying solution, the carbon deposited on the grain can be controlled. The foregoing sugar solution has a Baumé reading of 0.2; however, this can be varied over a wide range. I have used solutions having Baumé readings as extreme as .0083 and 27.1.

Wheels made of grain produced by the process just described are used where a "softer" wheel is required. That is, they are softer than those made by the first-described process probably due to the fact that the heat required to reduce the sugar or the like to carbon tends to make the resin bond relatively brittle.

Variations and modifications may be made within the scope of this invention and portions of the improvements may be used without others.

I claim:

1. A discrete abrasive grain having cutting-sugar carbon secured to the surface thereof.

2. A discrete aluminum oxide grain having cutting-sugar carbon secured to the surface thereof.

3. A discrete silicon carbide grain having cutting-sugar carbon secured to the surface thereof.

4. A discrete sand grain having cutting-sugar carbon bonded to the surface thereof.

5. A discrete abrasive grain having graphite and cutting-sugar carbon secured on the surface thereof.

6. An abrasive grain having colloidal cutting-sugar carbon resin bonded to the surface thereof.

7. An abrading member having discrete abrading grains and a binder therefor, said discrete grains having cutting-sugar carbon resin bonded to the surfaces thereof.

8. An abrading wheel for cutting metallic carbides and carbon-steels comprising discrete silicon carbide grains carrying on their surfaces crystalline sugar carbon, said discrete grains being bonded together and formed into a wheel.

9. A dressable cutting wheel comprising discrete friable grains having cutting-sugar carbon bonded to the surfaces thereof and a destructible bond, whereby as the outer surface of the wheel is broken down, new cutting surfaces having cutting-sugar carbon carrying grains are presented.

10. The process of producing fortified abrasive grains which comprises the steps of mixing grains and a binder to cause the binder to coat the surface of the grains, adding fine unctuous graphite to the coated grains and mixing the same to spread the graphite over the coated surface, and then adding particles of cutting-sugar carbon to the graphite coated grains and mixing the same to cause the carbon particles to be spread over the surfaces of the grains to be secured thereto by the binder.

11. The process of producing fortified abrasive grains which comprises the steps of mixing carbohydrates of a class consisting of sugar and molasses with water to form a solution thereof and adding a binder thereto, adding grains to the solution, and heating the mixture until the carbohydrate in the mixture is reduced to isotropic vitrescent sugar carbon particles adhered to the surfaces of the grains by a layer of the binder in the solution.

12. A discrete abrasive grain having sugar carbon resin-bonded to the surface thereof.

13. An abrading member comprising discrete grains, at least a portion of said discrete grains having a coating including sugar carbon bonded to the surface thereof; and means for bonding said discrete grains together.

JEFFERSON P. BUCKEY.

REFERENCES CITED

The following references are of record in the file of this patent:

UNITED STATES PATENTS

| Number | Name | Date |
|---|---|---|
| 224,078 | Copeland | Feb. 3, 1880 |
| 1,573,061 | Hartmann | Feb. 16, 1926 |
| 1,981,970 | Sanford | Nov. 27, 1934 |
| 2,125,782 | Heald | Aug. 2, 1938 |

FOREIGN PATENTS

| Number | Country | Date |
|---|---|---|
| 406,921 | Great Britain | Mar. 8, 1934 |